UNITED STATES PATENT OFFICE.

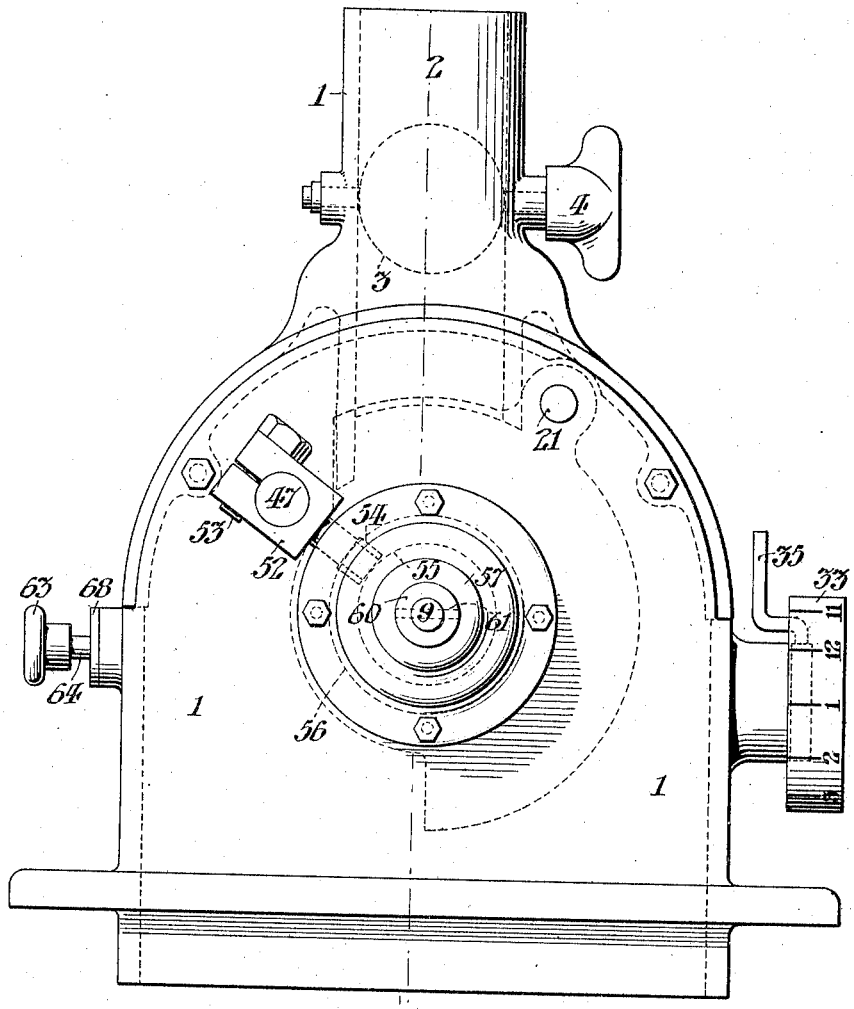

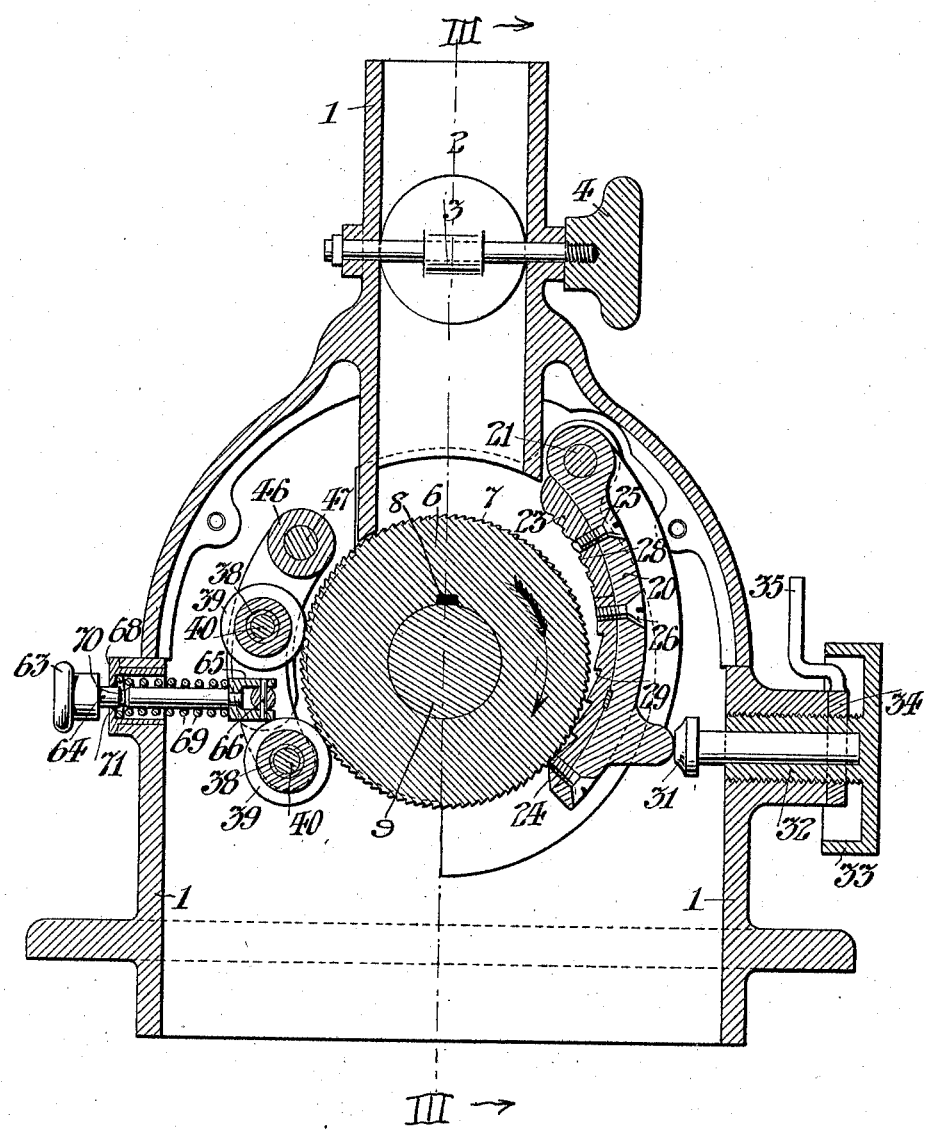

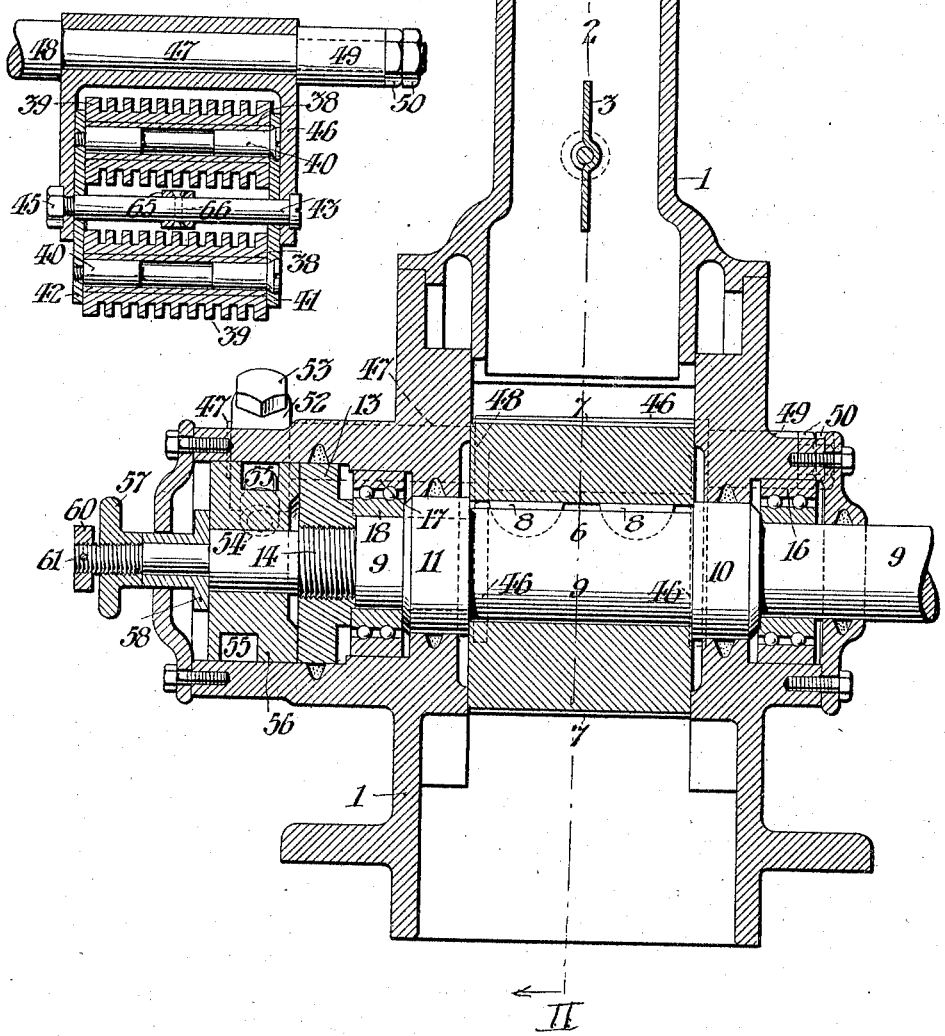

FREDERICK G. PECK, OF PHILADELPHIA, PENNSYLVANIA.

COFFEE-MILL.

1,315,152.  Specification of Letters Patent.  Patented Sept. 2, 1919.

Application filed April 30, 1917. Serial No. 165,352.

*To all whom it may concern:*

Be it known that I, FREDERICK G. PECK, a subject of Great Britain, residing at Philadelphia, in the State of Pennsylvania, have invented a certain new and useful Improvement in Coffee-Mills, whereof the following is a specification, reference being had to the accompanying drawings.

My invention relates to grinding mills of the general class shown in Letters Patent of the United States 1,011,603 granted to E. J. Franck, W. Sommers and L. Fritz, December 12, 1911; wherein a milling cutter having teeth on its circumference, which are ridges extending parallel with its axis, is provided with a roller to engage the teeth of said cutter and move axially with respect thereto to clean said teeth. My invention relates to the construction and arrangement of the means for operating a cleaning roller or rollers for such a cutter; whereby the cleaning mechanism may be rendered operative or inoperative at the will of the operator.

My invention comprises the various novel features of construction and arrangement hereinafter more definitely specified and claimed. The generic construction and arrangement of the mill herein disclosed are claimed in application Serial 165,313, filed April 30, 1917, for Letters Patent of the United States, by said William Sommers and Louis Fritz.

In the drawings: Figure I is a front elevation of a grinding mill conveniently embodying my improvement.

Fig. II is a central vertical sectional view of said mill, taken on the line II, II, in Fig. III, in the direction of the arrows marked thereon.

Fig. III is a vertical sectional view taken on the line III, III, in Figs. I and II in the direction of the arrows marked thereon.

Fig. IV is a vertical, partly sectional, view of the cleaning rollers and their supporting mechanism indicated in Fig. II.

In said figures; the casing 1 has the upper opening 2 for the grist, controlled by the disk valve 3 which may be rotated by the handle 4. The metallic cylindrical milling cutter 6 is rotatable upon a horizontal axis in said casing 1 and has teeth 7 which are ridges on its periphery parallel with its axis. Said cutter is connected by the keys 8 to turn with the driving shaft 9, on which it is rigidly secured between the stationary collar 10 and movable clamp collar 11; the latter being movable axially, to clamp said cutter between said collars, by the nut 13 which engages the screw thread 14 on said shaft. Said shaft is mounted to rotate in the ball bearings 16 and 17, and the inner race member 18 of the latter is movable axially on said shaft 9 to permit the aforesaid clamping action of said nut 13.

Said milling cutter 6 is opposed by the milling plate 20 which is the width of, and pendent opposite to, the toothed face of said cutter, from an immovable axis, parallel with but above the axis of said cutter; said plate being hung upon the shaft 21 so that its lower free end may be adjusted toward and away from said cutter. Said milling plate 20 is conveniently provided with two removable shoes 23 and 24, which are respectively adjustably connected therewith by the screws 25 and 26 and have teeth 28 and 29 on their faces extending toward and parallel with the teeth 7 on said cutter. It is to be noted that, as shown in Fig. II, the upper shoe teeth 28 are closer together and finer than the lower shoe teeth 29. As indicated in Fig. II; the adjustable means arranged to shift the free end of said plate 20 toward and away from said cutter 6 includes the pin 31 which is loosely mounted in the screw 32, which is in threaded engagement with said casing 1 and has the hollow milled head 33 by which it may be turned to axially shift said pin. Said screw 32 is provided with the jam nut 34 extending within the hollow head 33 of said screw but having the lever handle 35 extending exterior thereto whereby it may be conveniently turned.

The teeth 7 of said milling cutter 6 are apt to become clogged with the comminuted coffee, so as to vary the comminution of the latter, without the will of the operator, unless means are provided to keep the teeth clean when the mechanism is set to finely grind or pulverize the grist. Therefore, I provide the pair of cylindrical metallic cleaning rollers 38 which are journaled in said casing 1 with their axes parallel with said cutter 6 when in the operative position shown in Fig. II, and each has a face 39 of hard rubber, vulcanized fiber, or other suitable non-metallic material adapted to be indented by said cutter teeth 7 so as to mesh therewith and be rotated by said cutter. That is to say; the relative diameters of said cutter and its cleaning rollers are such that said cutter indents the soft material with which said rollers are faced, and such soft material projects between the cutter teeth to such an extent that said cutter drives said rollers as gears. As shown in Figs. II and IV, said cleaning rollers 38 are journaled on shafts 40 which are coupled by the yoke plates 41 and 42, with which latter they are rigidly connected, by their screw threaded ends shown in Fig. IV; so as to form a carriage for said rollers. Said yoke plates 41 and 42 are mounted to oscillate on the carriage shaft 43 which is held stationary, by the nut 45, in the carriage hanger 46, which is, however, free to oscillate upon the shaft 47 between the shoulder 48 and collar 49 thereon, the latter being rigidly connected with said shaft 47 by the lock nuts 50. As shown in Fig. I; said shaft 47 has at its outer end the arm 52 which is clamped thereon by the screw 53 and carries at its free end the roller 54 which is adapted to engage the groove 55 of the cam 56. Said cam may be detachably rigidly connected with said shaft, so as to be rotated by the latter, by means of suitable clutch mechanism, for instance, the nut 57, shown in Fig. III, which bears upon the outer end of the washer sleeve 58, the inner end of which bears upon the outer face of said cam 56 and holds said cam in frictional engagement with said nut 13. However, when said nut 57 is unscrewed, said cam is released from such frictional engagement and remains stationary while the shaft 9 rotates in it. The nut 60 which is secured upon the end of said shaft 9 by the pin 61 is merely to prevent accidental loss of said nut 57.

When said cleaning rollers and their driving mechanism above described are in the position shown in the drawings; rotation of said shaft 9, which is incident to the operation of said cutter 6, also turns said cam 56 and causes the cleaner shaft 47 to reciprocate axially in accordance with the serpentine configuration of the groove 55 in said cam. However, as it is unnecessary to operate said cleaning mechanism except when the milling plate 20 is set to effect fine grinding of the grist, and it is noisy; I provide said carriage with means adjustable to present said cleaning rollers 38 in engagement with said cutter teeth 7, and withhold them from such engagement. As shown in Fig. II, such means includes the handle 63 connected by the rod 64 with the clevis 65, which is pivotally connected by the pin 66 with said shaft 43, which is stationary in the carriage hanger as shown in Fig. IV. As shown in Fig. II, said rod 64 extends freely through the socket bushing 68 in said casing 1, and is provided with the compression spring 69 which bears at its outer end in said bushing and at its inner end upon said clevis so as to normally press said rollers 38 with their indentable faces 39 in engagement with the cutter teeth 7; the pivotal connection of said bar 64 with said shaft 43, by said pin 66, above described, being such as to permit reciprocation of the carriage and corresponding lateral oscillation of said rod 64 in said socket 68. However, when it is desired to retract and withhold said cleaning rollers from engagement with said milling cutter; said handle 63 may be withdrawn until the groove 70 in said rod is engaged with the flange 71 of said bushing, by depressing said handle. Of course, when said handle is again raised to permit said rod 64 to move freely through said bushing 68; said spring 69 returns the carriage to the operative position shown in Fig. II.

Of course, said opening 2 at the upper end of said casing 1 may be connected with a hopper or other source of supply of the coffee or other grist to be ground in said mill and which is upheld by the valve 3 when the latter is turned to horizontal position. When, however, said valve is turned to vertical position, as shown, the coffee or other material is then allowed to gravitate upon the upper toothed surface of said cutter 6, and, as said cutter is turned in the direction of the arrow on Fig. II, said material is caught by the teeth 7 and forced downwardly into the wedge shaped space between the circumference of said cutter and the adjacent toothed face of the milling plate 20. The upwardly inclined teeth 28 on the upper shoe 23 of said plate 20 catch the grains of coffee, or other material, so that they are rolled by the action of said cutter and coarsely granulated preliminary to their further comminution between the teeth 7 of said cutter and the downwardly inclined teeth 29 of the lower shoe 24. In the position shown in Fig. II; said milling plate 20 is so set and held by the pin 31 that the ground product is pulverized. However, if coarser grinding is desired; the jam nut 34 is loosened by movement of its lever handle 35; the milled head 33 of the screw 32 is turned to retract the latter to the desired extent; and the jam nut 34 then returned to its original position to prevent accidental displacement of said screw 32. It is to be understood that said screw head 33 may be graduated upon its circumference, as indicated in Fig. I, so that the operator may precisely adjust the same to a predetermined degree, corresponding with the desired comminution of the product.

However, it is to be understood that I do not desire to limit myself to the specific construction and arrangement of said milling plate and its appurtenances. Moreover, I do not desire to limit myself to the precise details of construction and arrangement herein set forth, as it is obvious that various modifications may be made therein without departing from the essential features of my invention as defined in the appended claims.

I claim:

1. In a grinding mill, the combination with a casing; of a milling cutter, rotatable in said casing, and having teeth; a cleaning roller; a carriage in which said roller is journaled with its axis parallel with the axis of said cutter; a hanger supporting said carriage; a shaft mounted to axially reciprocate in said casing and carrying said hanger; means arranged to reciprocate said reciprocatory shaft, including a cam on said cutter shaft, and clutch means arranged to alternately render said cam operative and inoperative; means arranged to adjustably turn said hanger on said reciprocatory shaft, to move said roller to and from operative relation with said cutter, including a rod; and means arranged to hold said rod in adjusted position.

2. In a grinding mill, the combination with a casing; of a milling cutter, rotatable in said casing, and having teeth; a cleaning roller; a carriage in which said roller is journaled with its axis parallel with the axis of said cutter; a hanger supporting said carriage; a shaft mounted to axially reciprocate in said casing and carrying said hanger; means arranged to reciprocate said reciprocatory shaft, including a cam, and clutch means arranged to alternately render said cam operative and inoperative; means arranged to adjustably turn said hanger on said reciprocatory shaft, to move said roller to and from operative relation with said cutter, including a rod; and means arranged to hold said rod in adjusted position.

3. In a grinding mill, the combination with a casing; of a milling cutter, rotatable in said casing, and having teeth; a cleaning roller; a carriage in which said roller is journaled with its axis parallel with the axis of said cutter; a hanger supporting said carriage; a shaft mounted to axially reciprocate in said casing and carrying said hanger; means arranged to reciprocate said reciprocatory shaft, including a cam on said cutter shaft, and clutch means arranged to alternately render said cam operative and inoperative.

4. In a grinding mill, the combination with a casing; of a milling cutter, rotatable in said casing, and having teeth; a cleaning roller; a carriage in which said roller is journaled with its axis parallel with the axis of said cutter; a hanger supporting said carriage; a shaft mounted to axially reciprocate in said casing and carrying said hanger; means arranged to reciprocate said reciprocatory shaft, including a cam, and clutch means arranged to alternately render said cam operative and inoperative.

5. In a grinding mill, the combination with a casing; of a milling cutter, rotatable in said casing, and having teeth; a cleaning roller; a carriage in which said roller is journaled with its axis parallel with the axis of said cutter; a hanger supporting said carriage; a shaft mounted to axially reciprocate in said casing and carrying said hanger; means arranged to reciprocate said reciprocatory shaft; means arranged to adjustably turn said hanger on said reciprocatory shaft, to move said roller to and from operative relation with said cutter, including a rod; and means arranged to hold said rod in adjusted position.

6. In a grinding mill, the combination with a casing; of a milling cutter, rotatable in said casing, and having teeth; a cleaning roller; a carriage in which said roller is journaled with its axis parallel with the axis of said cutter; a hanger supporting said carriage; means arranged to adjustably turn said hanger, to move said roller to and from operative relation with said cutter, including a rod; and means arranged to hold said rod in adjusted position.

7. In a grinding mill, the combination with a casing; of a milling cutter, rotatable in said casing, and having teeth; a pair of independently rotatable cleaning rollers; a carriage in which said rollers are journaled with their axes parallel with the axis of said cutter; an oscillatory hanger pivotally supporting said carriage, and limiting the transverse movement of the latter to a circular arc; means arranged to adjustably turn said hanger in said arc, to move said rollers to and from engagement with the teeth of said cutter; and means arranged to reciprocate said hanger, parallel with the axis of said cutter, including an axially reciprocatory shaft, in said casing, forming the pivot for said hanger; means preventing the rotation of said shaft; a roller carried by said shaft; and a cam arranged to turn in coaxial relation with said cutter, having a spiral groove engaging said roller.

8. In a grinding mill, the combination with a casing; of a milling cutter, rotatable in said casing, and having teeth; a pair of rotatable cleaning rollers; a carriage in which said rollers are journaled; an oscillatory hanger pivotally connected with said carriage, and limiting the transverse movement of the latter to a circular arc; means arranged to adjustably turn said hanger in said arc, to move said rollers to and from engagement with the teeth of said cutter; and means arranged to reciprocate said hanger, parallel with the axis of said cutter, including an axially reciprocatory shaft, in said casing, forming the pivot for said hanger; means preventing the rotation of said shaft; a roller carried by said shaft; and a cam arranged to turn in coaxial relation with said cutter, having a spiral groove engaging said roller.

9. In a grinding mill, the combination with a casing; of a milling cutter, rotatable in said casing, and having teeth; a pair of independently rotatable cleaning rollers; a carriage in which said rollers are journaled with their axes parallel with the axis of said cutter; an oscillatory hanger supporting said carriage, and limiting the transverse movement of the latter to a circular arc; means arranged to oscillate said hanger, to move said rollers to and from engagement with the teeth of said cutter; and means arranged to reciprocate said hanger, parallel with the axis of said cutter, including an axially reciprocatory shaft, a roller carried by said shaft, and a cam arranged to turn in coaxial relation with said cutter while engaging said roller.

10. In a grinding mill, the combination with a casing; of a milling cutter, rotatable in said casing, and having teeth; a rotatable cleaning roller; a carriage in which said roller is journaled with its axis parallel with the axis of said cutter; an oscillatory hanger pivotally connected with said carriage, and limiting the transverse movement of the latter to a circular arc; means arranged to adjustably oscillate said hanger, to move said roller to and from engagement with the teeth of said cutter; and means arranged to reciprocate said hanger, parallel with the axis of said cutter, including an axially reciprocatory shaft, in said casing, forming the pivot for said hanger, a cam arranged to turn in coaxial relation with said cutter, and means operatively connecting said shaft and cam.

11. In a grinding mill, the combination with a casing; of a milling cutter, rotatable in said casing, and having teeth; a rotatable cleaning roller; a carriage in which said roller is journaled with its axis parallel with the axis of said cutter; an oscillatory hanger connected with said carriage; means arranged to turn said hanger, to move said roller to and from engagement with the teeth of said cutter; means arranged to reciprocate said hanger, parallel with the axis of said cutter, including an axially reciprocatory shaft, in said casing, forming the pivot for said hanger, a rotary cam, and means operatively connecting said shaft and cam; and clutch means arranged to connect and disconnect said cam and cutter; whereby said cam may be rendered operative or inoperative while said cutter is rotating.

12. In a mill roll cleaning mechanism, the combination with a rotary shaft having an abutment and a screw thread; of a mill roll carried by said shaft; a pair of cleaning rollers for said mill roll; a carriage in which said rollers are journaled; a carriage shaft operatively connected with a cam roller; means arranged to reciprocate said carriage, with said cleaning rollers in coöperative relation with said mill roll, including an axially movable cam on said first shaft, having a serpentine groove engaging said cam roller; a washer sleeve on said first shaft adjoining said cam, and a clamping nut engaging said screw thread; whereby said cam may be frictionally clamped, against said abutment, to turn with said milling roll, and actuate said cleaning rollers, to coöperate with said roll to clean the latter, and be released to permit that shaft to turn in said cam while said cam remains stationary to stop the cleaning operation without stopping the milling operation; and a stop nut on said screw thread, preventing removal of said clamping nut.

13. In a mill roll cleaning mechanism, the combination with a rotary shaft having an abutment and a screw thread; of a mill roll carried by said shaft; a cleaning roller for said mill roll; a carriage in which said roller is journaled; means arranged to reciprocate said carriage, with said cleaning roller in coöperative relation with said mill roll, including a cam on said shaft, and a clamping nut engaging said screw thread; whereby said cam may be frictionally clamped against said abutment, to turn with said mill roll, and be released to permit said shaft to turn in said cam while said cam remains stationary.

14. In a mill roll cleaning mechanism, the combination with a rotary shaft having a terminal screw thread and an intermediate abutment; of a mill roll carried by said shaft; a cleaning roller for said mill roll; a carriage in which said roller is journaled; means arranged to reciprocate said carriage, with said cleaning roller in coöperative relation with said mill roll, including a cam on said shaft, and a clamping nut engaging said screw thread; whereby said cam may be frictionally clamped against said abutment, to turn with said mill roll, and be released to permit said shaft to turn in said cam while said cam remains stationary.

15. In a mill roll cleaning mechanism, the combination with a rotary shaft having a screw thread; of a mill roll on said shaft; an abutment on said shaft; a cleaning roller; a carriage in which said roller is journaled; and means arranged to reciprocate said carriage, including a cam on said shaft, and a clamping nut engaging said screw thread; whereby said cam may be frictionally clamped against said abutment, to turn with said mill roll, and be released to permit that shaft and roll to rotate while said cam remains stationary.

16. In a grinding mill, the combination with a casing; of a rotary cutter shaft, journaled in said casing; a milling cutter on said shaft; a cleaning roller; an oscillatory carriage in which said roller is journaled; and means arranged to move said carriage to shift said roller to and from operative relation with said cutter, including a socket bushing in said casing, having an internal annular flange, a clevis on the carriage shaft, a pivot pin connecting said clevis and shaft, with its axis transverse to the axis of said roller, a rod extending from said clevis through said socket, and having a groove arranged to engage said socket flange when said rod is drawn outwardly, to detachably hold said roller out of operative position; a handle on said rod, exterior to said casing; and a compression spring encircling said rod, between said clevis and said flange, tending to hold said roller in operative position.

17. In a grinding mill, the combination with a casing; of a rotary cutter shaft, journaled in said casing; a milling cutter on said shaft; a cleaning roller; an oscillatory carriage in which said roller is journaled; and means arranged to move said roller to and from operative relation with said cutter; including a socket in said casing, having an internal annular flange, a clevis on the carriage shaft, a pivot pin connecting said clevis and shaft, with its axis transverse to the axis of said roller, a rod extending from said clevis through said socket, and having a groove arranged to engage said socket flange when said rod is drawn outwardly, to detachably hold said roller out of operative position; and a spring tending to hold said roller in operative position.

18. In a grinding mill, the combination with a rotary cutter having a cylindrical series of teeth; of a cleaning roller for said cutter, having a facing of soft material, capable of being impressed by the cutter teeth and projecting between the same; said cutter teeth being equally spaced circumferentially and the relative diameters of said cutter and roller being such that said cutter drives said roller as a gear.

19. In a mill roll cleaning mechanism, the combination with a cleaning roller; of a carriage in which said roller is journaled; means arranged to reciprocate said carriage, with said roller in coöperative relation with the roll which it is to clean, including a shaft carrying a cam, and clamping means; whereby said cam may be clamped to turn with said shaft, and be released to permit said shaft to turn while said cam remains stationary.

In testimony whereof, I have hereunto signed my name at Philadelphia, Pennsylvania, this twenty-sixth day of April, 1917.

FREDERICK G. PECK.

Witnesses:
R. L. HART,
ED. BURG.